(12) United States Patent
Khan et al.

(10) Patent No.: US 10,497,397 B2
(45) Date of Patent: Dec. 3, 2019

(54) GENERATING VIDEO-NOTES FROM VIDEOS USING MACHINE LEARNING

(71) Applicant: International Business Machines Corporation, Armonk, NY (US)

(72) Inventors: Azad Khan, Bangalore (IN); Abhinav Radke, Bangalore (IN); Hemlata Bhatt, Bangalore (IN); Kapish Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/829,089

(22) Filed: Dec. 1, 2017

(65) Prior Publication Data

US 2019/0172493 A1    Jun. 6, 2019

(51) Int. Cl.
| | | |
|---|---|---|
| G11B 27/00 | (2006.01) | |
| H04N 5/93 | (2006.01) | |
| G11B 27/02 | (2006.01) | |
| G06N 20/00 | (2019.01) | |
| H04N 9/80 | (2006.01) | |
| H04N 5/92 | (2006.01) | |

(52) U.S. Cl.
CPC ............. *G11B 27/02* (2013.01); *G06N 20/00* (2019.01)

(58) Field of Classification Search
USPC ........ 386/278, 280, 282, 285, 201, 239, 245
See application file for complete search history.

(56) References Cited

U.S. PATENT DOCUMENTS

| | | | |
|---|---|---|---|
| 6,535,639 B1 * | 3/2003 | Uchihachi | G06F 17/30799 341/79 |
| 9,286,938 B1 | 3/2016 | Tseytlin | |
| 2003/0177503 A1 * | 9/2003 | Sull | G06T 3/4092 725/112 |
| 2005/0180462 A1 * | 8/2005 | Yi | H04H 20/28 370/487 |
| 2016/0260339 A1 | 9/2016 | Subashchandrabose et al. | |
| 2016/0381419 A1 * | 12/2016 | Zhang | G06F 3/01 725/14 |

* cited by examiner

*Primary Examiner* — Daquan Zhao
(74) *Attorney, Agent, or Firm* — Reza Sarbakhsh; Edell, Shapiro & Finnan, LLC

(57) ABSTRACT

A method, system and computer readable media are provided to generate short video notes (v-notes) from one or more videos. A series of inputs including playback commands from a user is received. By utilizing a machine learning system, the received inputs can be analyzed for video content to identify which portions are of importance. A customized v-note, smaller in size than the one or more videos, may be generated by aggregating the identified portions of video content from the one or more videos, wherein the v-note is customized to the user, based upon received inputs from the user.

20 Claims, 6 Drawing Sheets

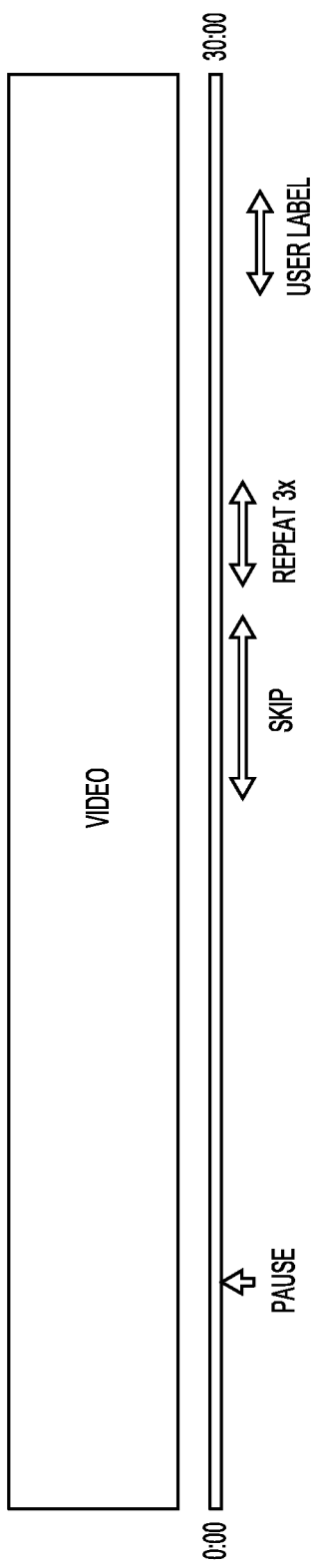
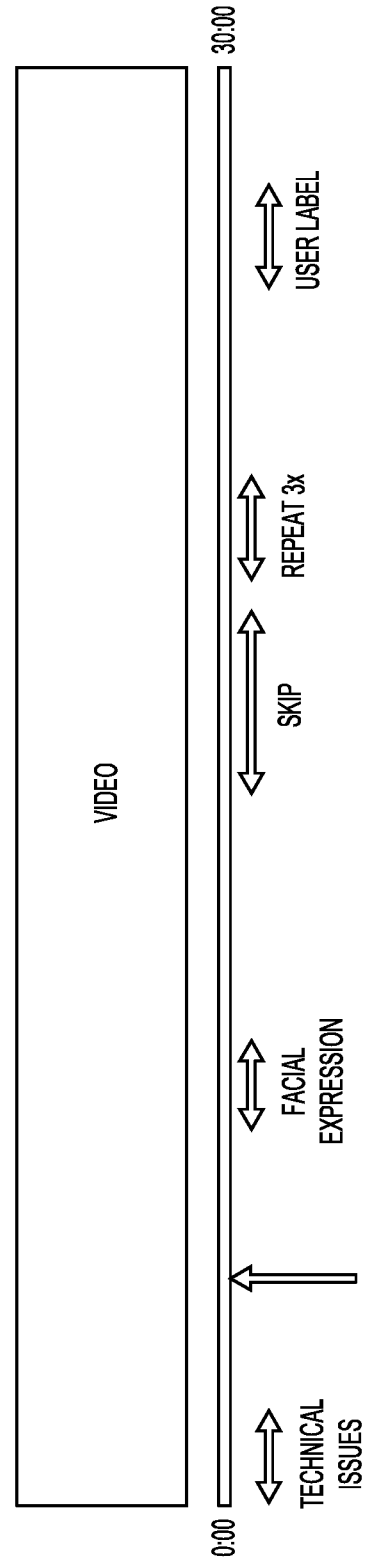

GENERATING VIDEO-NOTES FROM VIDEOS USING MACHINE LEARNING

BACKGROUND

1. Technical Field

Present invention embodiments relate to video manipulation, and more specifically, to creating short customized videos (video notes or v-notes) from a larger video or a set of videos.

2. Discussion of the Related Art

The availability of video capturing and sharing devices has greatly increased over the past several decades. For example, companies may utilize video resources for training employees. Educational institutions, including high schools, colleges and universities, may broadcast classroom lectures in order to share course resources, thereby replacing or supplementing traditional text based study and note taking. Web channels may be utilized online, e.g., YOUTUBE®, DAILY MOTION®, etc., to provide video content to a broad group of users. While convenient, these large segments of video are often time consuming and difficult to review, e.g., as part of preparation for a test. Additionally, different users may wish to review different portions of the video content, as different content may be important to different people.

While the ease of capturing and sharing a video has dramatically influenced modern day technology, particularly with respect to training and education, it is still difficult to review such videos in a time efficient manner.

SUMMARY

According to embodiments of the present invention, a method, system and computer program product are provided to generate a video note (v-note), which is a video composed of important video content from one or more videos, and smaller in size than the respective one or more videos from which the v-note is derived. Inputs from a user are received, wherein the inputs may correspond to commands controlling playback of one or more videos. A machine learning system/cognitive system is utilized to identify which portions of the video content are of importance to a user based on the user's inputs. A customized v-note for the user is generated by aggregating the identified portions of video content, to produce a v-note smaller in size than the one or more videos.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components. Through the more detailed description of some embodiments of the present disclosure in the accompanying drawings, the above and other objects, features and advantages of the present disclosure will become more apparent.

FIGS. 2A-2B are example diagrams showing video content in accordance with embodiments of the present disclosure.

DETAILED DESCRIPTION

For example, a user learning a new subject may issue a command to a video playback module to repeat a portion of the video content that he/she does not understand, to pause at important portions of the video content, or to skip sections of the video content that are not important. Based on these commands, a machine learning system/cognitive system 48 can generate a short v-note composed of portions of video content determined to be important to a user. In some embodiments, the machine learning system/cognitive system 48 can additionally utilize language analysis and facial expressions (in addition to user commands and user labeling) to create a short v-note comprising video content of interest or importance to the user.

The v-note includes important portions of video content, similar to text based summaries from traditional modes of note taking, but in a video format. The techniques presented herein eliminate the need of creating text based notes to capture important or essential content of a video, e.g., for later review as part of preparing for a test.

Advantages of present invention embodiments include the capability of reviewing the most important video content in a short period of time, as a user does not need to review the entire video or a set of videos. Additionally, the v-note can be customized to each user, focusing on the content important to a particular user.

Figure 1:
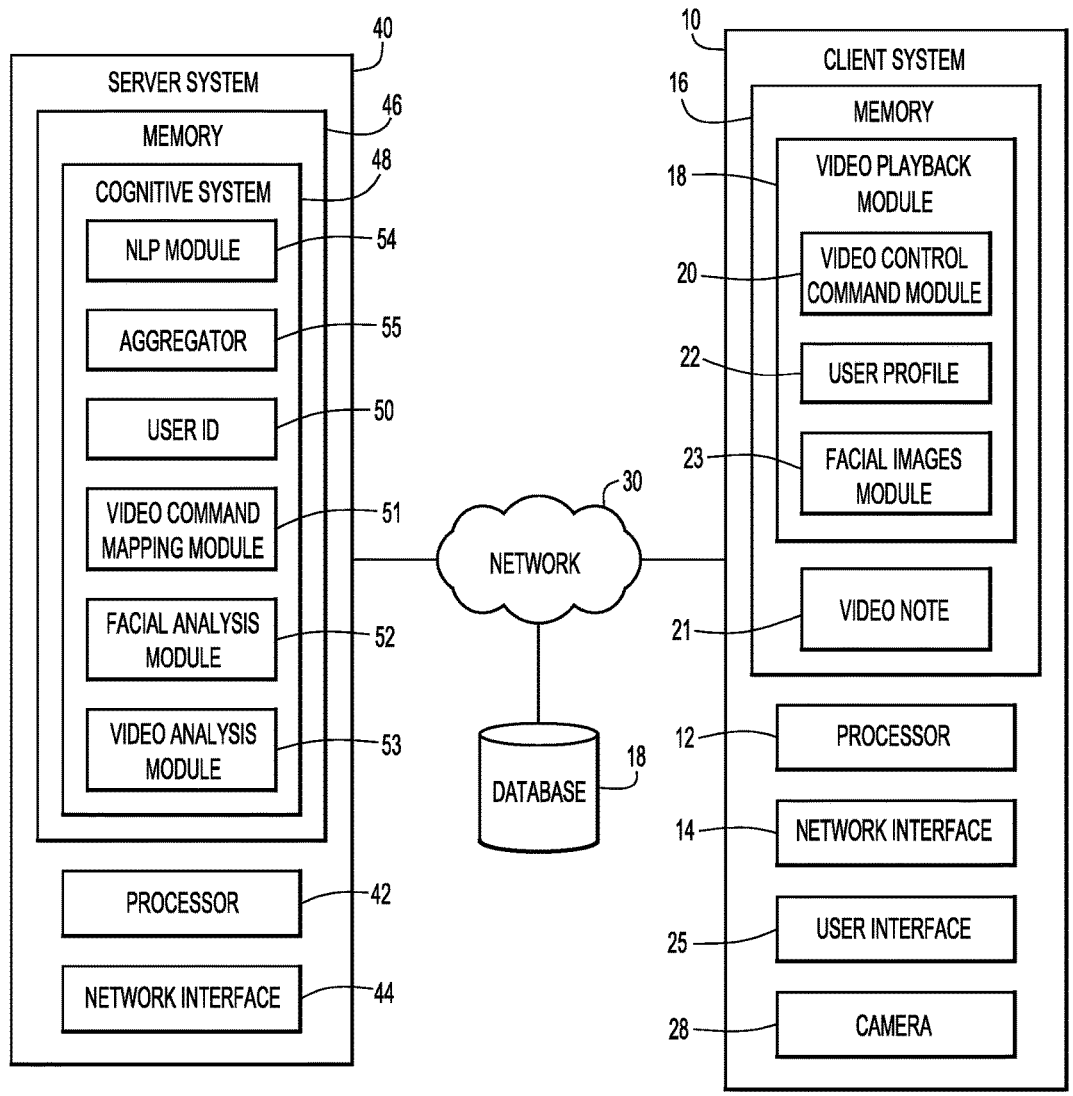
FIG. 1 is a block diagram of an example computing environment in accordance with embodiments of the present disclosure.

With reference now to FIG. 1 and in accordance with embodiments of the present disclosure, a block diagram of an example computing environment for a video note system 100 is provided.

Client system 10 may track user commands corresponding to controlling playback of one or more videos, including but not limited to: (1) which portion of the video content is repeated, (2) which portion of the video content is paused, (3) which portion of the video content is skipped, (4) and which portion of the video content is labeled (e.g., via a user interface) as important by the user within the video note system. This information, which is metadata personalized to the viewing patterns of an individual, may be transmitted to server system 40 along with the videos that the user viewed. Transmission of the videos and the video annotation file may occur using any suitable techniques known in the art, including FTP, web-based file sharing platforms, etc.

In an embodiment, a video annotation file is produced comprising one or more commands issued by a user along with the corresponding position in the video at which the command is issued, thereby linking the commands to specific portions of video content. In another embodiment, each command issued by the user may be transmitted directly to server system 40, along with the corresponding position in the video at which the command is issued.

The video note system may utilize a machine learning/cognitive system 48 to assign importance to video content, and may include one or more of the following inputs: (1) user commands and user labeled video content, e.g., from the video annotation file, (2) facial expressions obtained from facial recognition technology, (3) language analysis, and (4) video analysis. Each of these factors is considered in additional detail throughout the application.

After identification of the important video content, the identified content is aggregated, and a v-note is created, to produce an amalgamation of important content.

Specifically, the computing environment includes one or more client or end-user systems 10 and one or more server systems 40. Server systems 40 and client systems 10 may be remote from each other and communicate over a network 30. The network may be implemented by any number of any suitable communications media (e.g., wide area network (WAN), local area network (LAN), Internet, Intranet, etc.). Alternatively, server systems 40 and client systems 10 may be local to each other, and communicate via any appropriate local communication medium (e.g., local area network (LAN), hardwire, wireless link, Intranet, etc.).

Client systems 10 enable users to playback videos (e.g., one or more educational videos, training videos, entertainment videos, etc.) and to issue commands to control the playback of video content. In some embodiments, a user may label portions of video content to include in the v-note. The server systems 40 generate a v-note corresponding to video content identified as important by the user.

A database system 18 may store various information for the analysis (e.g., videos, v-notes, user IDs, data pertaining to facial analysis, data pertaining to command mapping, algorithms and parameters to identify complete sentences in one or more languages, algorithms and parameters to identify important and unimportant video content, etc.). The database system 18 may be implemented by any conventional or other database or storage unit, may be local to or remote from server systems 40 and client systems 10, and may communicate via any appropriate communication medium (e.g., local area network (LAN), wide area network (WAN), Internet, hardwire, wireless link, Intranet, etc.).

The client systems 10 may present a graphical user (e.g., GUI, etc.) or other user interface 25 (e.g., command line prompts, menu screens, etc.) to solicit information from users pertaining to video playback or analysis of video content, and in some cases, may provide a report (e.g., a video annotation file, etc.) for the user to view. In some embodiments, the graphical user interface 25 may allow the user to interact with the video annotation file, to remove or add commands or user labeling before processing by the cognitive system 48.

Client systems 10 and server systems 40 may be implemented by any conventional or other computer systems preferably equipped with a display or monitor, a base (e.g., including, respectfully, at least one processor 12 or 42; one or more memories 16 or 46 and/or internal or external network interfaces or communications devices 14 or 44 (e.g., modem, network cards, etc.)), optional input devices (e.g., a keyboard, mouse or other input device), and any commercially available and custom software (e.g., server/communications software, video playback module, cognitive system module, browser/interface software, etc.).

Alternatively, one or more client systems 10 may identify important video content and generate a v-note corresponding to the identified content when operating as a stand-alone unit. In a stand-alone mode of operation, the client system stores or has access to the videos and includes cognitive module 48. The graphical user (e.g., GUI, etc.) or other interface 25 (e.g., command line prompts, menu screens, etc.) solicits information (e.g., inputs) from a corresponding user pertaining to video playback and in some cases, may provide a report (e.g., a visual mapping or file showing video annotation, the length of the identified content, etc.). In some embodiments, the graphical user interface may allow the user to interact with the report or video annotation file, e.g., to remove or add commands or user labeling before processing by the cognitive system.

Video playback module 18 may include one or more modules or units to perform the various functions of present invention embodiments described herein. The various modules (e.g., video playback module 18, including video control command module 20, user profile 22, and facial images module 23) may be implemented by any combination of any quantity of software and/or hardware modules or units, and may reside in memory 16 of the client systems for execution by processor 12.

Video playback module 18 comprises video control command module 20, user profile 22, and facial images module 23. Video control command module 20 allows users to issue commands to control playback of the video, including commands to repeat, pause or skip video content as well as label content (e.g., based on text or other form of markup). For example, for a video that is 5 minutes in length, a user may repeat playback of the video content starting at 3 minutes and 20 seconds continuing to 4 minutes and 15 seconds. Thus, the video annotation file will include the command "Repeat" and the corresponding position, e.g., a video timestamp of 3:20-4:15, to indication the portion of the video content that is replayed.

Facial images module 23 may collect images of the user using camera 28 to send to the server system 40, in order to determine interest or lack of interest based on facial expressions of the user while watching the video. Both an image of the user's face and the corresponding position of the video is reported so that facial expressions can be mapped to portions of the video, e.g., using a video timestamp. Thus, camera 28 may be integrated into client system 10 allowing the facial expressions of a user to be captured while the user watches the video. The machine learning system/cognitive system 48 can determine the importance of content by comparing the facial expressions of the user to reference facial expressions from a population of individuals or from a training set data of facial expression images from the user showing interest or boredom.

User interface 25 allows the user to interact with the video playback module 18. In some embodiments, the user may review the video annotation file, and may remove commands or labels corresponding to portions of video content that the user does not wish to include in the v-note 21 produced by server 40, or alternatively, may add commands or labels corresponding to portions of video content that the user wishes to include in the v-note.

User profile 22 may also include information to identify the user, and to identify the client system 10 computer in order to send the v-note to the proper user. User identifying information may be provided to server 40 along with the video annotation files and videos.

With respect to server system 40, the various modules (e.g., cognitive system 48, etc.) may be implemented by any combination of any quantity of software and/or hardware modules or units, and may reside within memory 46 of the server systems for execution by processor 42. Cognitive system 48 may comprise video command mapping module 51, facial analysis module 52, video analysis module 53, natural language processing (NLP) module 54, and aggregator 55. Video command mapping module 51 may receive a video annotation file generated by client system 10 (or information equivalent to the video annotation file transmitted in real-time or near real time, as the video is undergoing playback by the user) and may map the information in the video annotation file to the video content as shown in FIGS. 2A-2B, 3A-3B. The video annotation file comprises commands issued by the user regarding playback of video content and labels indicating video content to include as well as the position of the video corresponding to execution of the command, e.g., the position may be indicated by a video timestamp. In some embodiments, cognitive system 48 may analyze the mapping generated by video command mapping module 51 to identify portions of video content that are important (see also FIGS. 2A-2B, 3A-3B).

Cognitive system 48 may also utilize facial analysis module 52, which receives and analyzes images of the user while watching the videos. Facial analysis module 52 analyzes expressions of the user to determine whether or not the user is interested in a particular portion of video content. Facial images may be provided as a file comprising a series of images, each image having a video timestamp, allowing the facial images to be mapped to a specified position of the video.

User ID 50 may maintain information correlating the v-note and the user to which the v-note will be sent.

Video analysis module 53 may analyze the mapping of the video annotation file to the video to identify important content. In some embodiments, overlapping video content or the same video content may be replayed multiple times. Rather than including each replayed portion of video content, which would lead to duplication, video analysis module 53 may identify a range of replayed content corresponding to the multitude of replay commands, and may designate this range of replayed content to be included once in the v-note. In other embodiments, the video analysis module 53 may resolve conflicts among commands, e.g., if a portion of video content contains two commands that suggest importance and a third command that suggests lack of importance, then the video command may analyze the conflicting commands, which may include labels, to determine whether or not the content is important. Video analysis module 53 also analyzes the video for unimportant content arising from, for example, technical issues including delays in starting the video, static content within the video from loss of connectivity, buffering issues, video intermissions, or corrupt portions of the video. By identifying these portions as unimportant, these portions may be excluded from being incorporated into the v-note.

In some embodiments, once content has been identified as important, natural language processing module 54 will analyze the corresponding voice recording of the video to determine the beginning of and end of sentences, so that only complete sentences along with the corresponding portions of video are sent to aggregator 55. For example, the machine learning system/cognitive system 48 can analyze the voice component of the video to determine complete sentences, map complete sentences to video content, and adjust the identified portions of video content to align with the beginning of or end of sentences. Any suitable language may be analyzed by NLP module 54 of the machine learning system/cognitive system 48. Aggregator 55 aggregates, in chronological order or any other suitable order, the one or more identified portions of video content to produce v-note 21, which is sent back to client system 10 or stored on database 18.

FIG. 2A shows an example annotation of video content in accordance with an embodiment of the present disclosure. The video command mapping module 51 can map commands to video positions to generate the annotated video content. In this example, annotation is presented in graphical format, however, any suitable format (e.g., text based, number based, etc.) is contemplated herein. For example, video control command module 20 may generate and send to cognitive system 48, a video annotation file listing commands and/or labels issued by a user along with the corresponding position in the video at which the command or label is issued (e.g., a video timestamp). In this example, the user issues a pause command, a skip command, a repeat command 3× and adds a user label at various positions along the 30 minute video. These annotations are shown in chronological order from the beginning of the video at timestamp 0:00 to the end of the video at timestamp 30:00.

FIG. 2B also shows annotation of video content in accordance with an embodiment of the present disclosure. In this example, annotations by the machine learning system/cognitive system 48 are superimposed, including portions of the video content that are identified to be important (e.g., based on facial expressions by facial analysis module 52), as well as video content identified as not important (e.g., technical issues identified by video analysis module 53. The machine learning system/cognitive system 48 can identify and exclude portions of video content devoid of important content.

In some embodiments, each type of command may be associated with a corresponding weight. For example, if a user pauses a video at a certain point in time, this command may carry an intermediate weighting. If the user skips a portion of the video content, this may carry a low weighting. If a user repeats a portion of video content this may carry a high weighting. Associating weights with each type of command may lead to more accurate identification of important information. For example, a user may pause a video for reasons other than interest, e.g., due to a time constraint, and therefore, it may be desirable to weight replay operations greater than pause operations. In some other embodiments, the user may provide feedback to the cognitive system 48 regarding identified portions of video content (to confirm whether the content is important), allowing refinement of the weights by the machine learning system/cognitive system 48.

In still other embodiments, the cognitive system 48 can track the number of indications of importance for a portion of video content (e.g., the indication may be a command, user labeling, a level of interest from the facial analysis module 52, etc.). A high level of importance may be assigned to portions of video content with multiple indications of importance and a low level of importance may be assigned to portions of video content with zero or one indications of importance. By adjusting a size threshold relative to the level of importance, the size of the v-note may be controlled. For example, a low size threshold may generate a larger v-note (including all video content with at least one indication), while a high size threshold may generate a smaller v-note (e.g., including content with at least two or more, or at least three or more indications). Indications of importance for a portion of video content may be aggregated in order to exceed the size threshold for inclusion of the video content in the v-note.

Figure 3A:
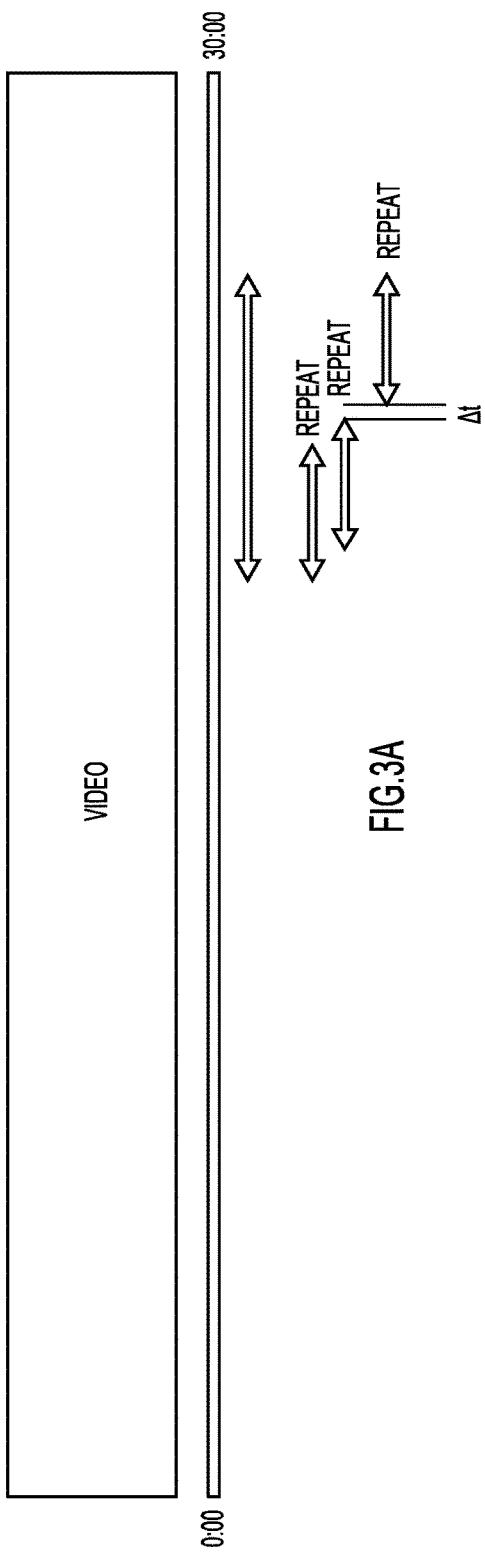
FIGS. 3A-3B are example diagrams showing video content in accordance with embodiments of the present disclosure.
Figure 3B:
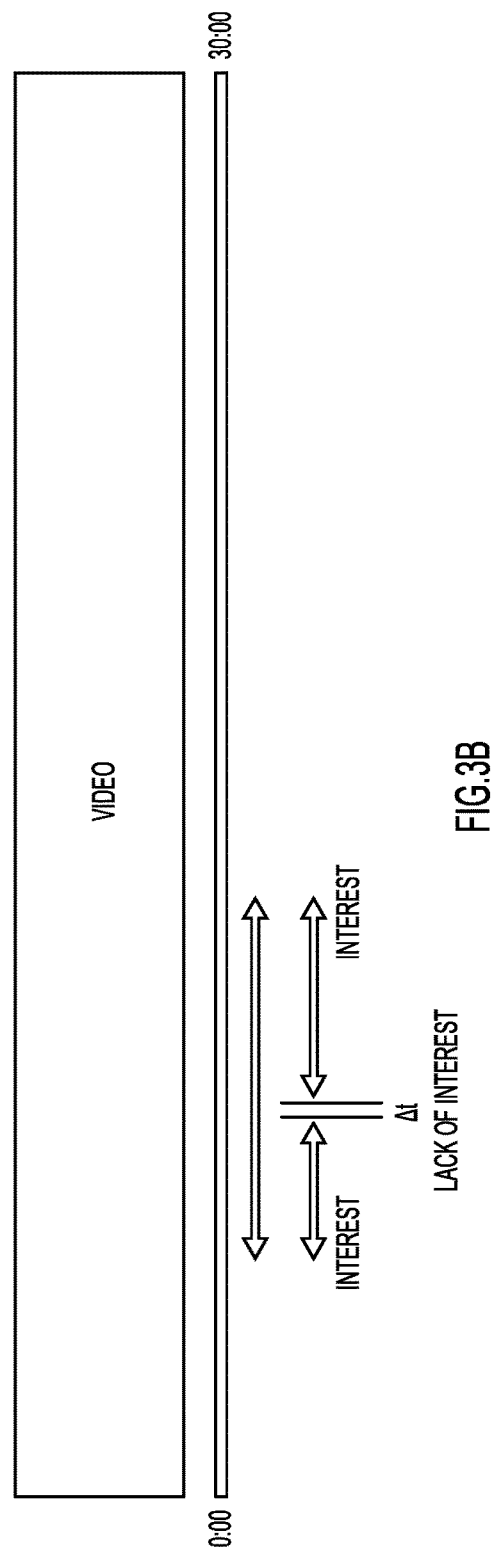

FIGS. 3A-3B show additional examples of the techniques presented herein. FIG. 3A shows an example operation of the cognitive system 48. A video annotation file may be received from client 10, indicating that a portion of the video has been repeated multiple times. The information in the video annotation file may be mapped to the video using video command mapping module 51. Rather than including each portion that is repeated using the video control command module 20 (leading to duplicity and overlap in the v-note), portions of the video that are replayed multiple times are only included once in the v-note, if identified to be of importance, e.g., by the video analysis module 53. Instead of including the video content corresponding to each repeat command, which would lead to duplicate and overlapping portions of video content, a range is determined which includes all repeat commands, and this range of replayed video content is included in the v-note.

Additionally, a user may repeat portions of the video that are within a specified position (e.g., time proximity Δt) of each other. In this case, the system may combine multiple portions of video content within a specified time proximity into a single portion of video content. Thus, in this example, the repeated portions (e.g., when overlapping or falling within a specified time proximity Δt) may be converted into a range of video content to be included in the v-note, thereby avoiding duplicate or overlapping content.

FIG. 3B shows another example of the cognitive system 48 in regards to facial expression. Here, facial expressions are mapped to a portion of the video based on a video timestamp. Two portions of video content are associated with a level of interest, and are separated by a short portion of video content indicating lack of interest (e.g., by a yawn). In this case, the machine learning system/cognitive system 48 may include the entire portion and disregard the short segment (Δt) in between, e.g., which may be based on fatigue rather than lack of interest. Video analysis module 53 is able to analyze multiple commands and make decisions on whether video content is important or unimportant, e.g., when commands or labeling may be conflicting. The cognitive system may determine to ignore the indication of lack of interest if the specified time proximity is sufficiently small, (e.g., when overlapping or falling within a specified time Δt). The multiple portions of video content may be converted into a single range of video content to be included in the v-note, thereby avoiding duplicate or overlapping content.

Figure 4:
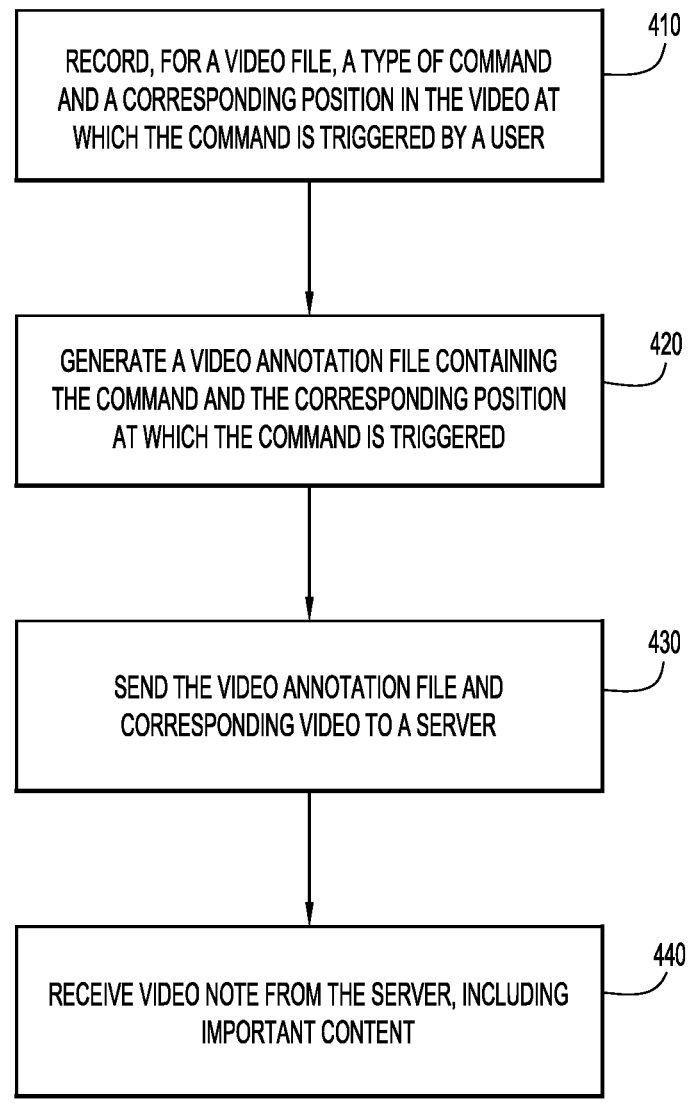
FIG. 4 is a flowchart of an example computer-implemented method of client operations to record user inputs and generate a video annotation file according to an embodiment of the present disclosure.

FIG. 4 shows an example embodiment of operations occurring at client 10. At operation 410, a command to control playback of a video and a corresponding position in the video at which the command is triggered by a user is recorded. At operation 420, a video annotation file is generated containing the command and the corresponding position at which the command is triggered. At operation 430, the video annotation file and corresponding video are sent to a server. At operation 440, the v-note is received from the server, wherein the v-note includes important content.

Figure 5:
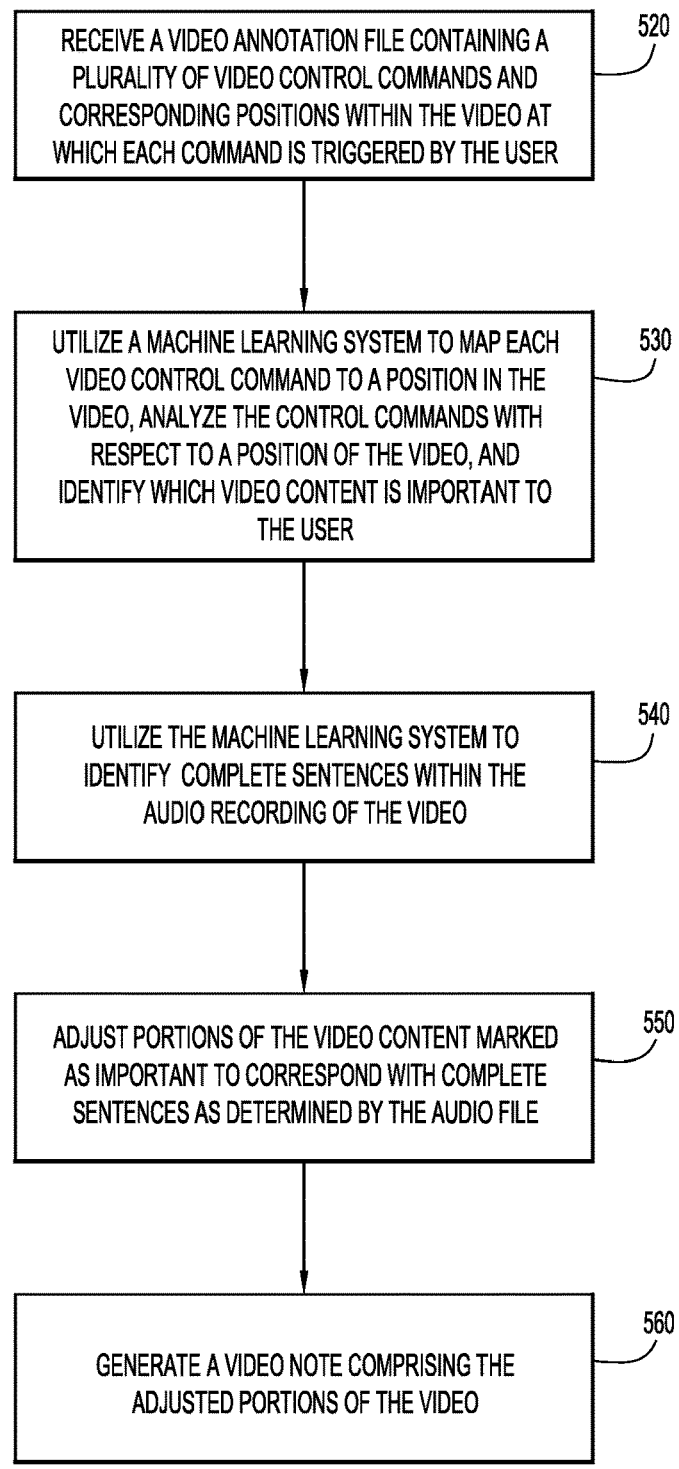
FIG. 5 is a flowchart of an example computer-implemented method of server operations to generate a customized video note for a user according to an embodiment of the present disclosure.

FIG. 5 shows an example embodiment of operations occurring at server 40. At operation 520, a video annotation file containing a plurality of video control commands and corresponding positions within the video at which each command is triggered by the user is received. At operation 530, the machine learning system/cognitive system 48 is utilized to map each video control command to a position in the video, analyze the video control commands with respect to a position of the video, and identify which portion of the video content is important to the user. At operation 540, the machine learning/cognitive system 48 is utilized to identify complete sentences within the audio recording of the video. At operation 550, portions of the video identified as important are adjusted (e.g., expanded or contracted) to correspond with complete sentences as determined by the audio file. At operation 560, a v-note is generated comprising the adjusted portions of the video.

Figure 6:
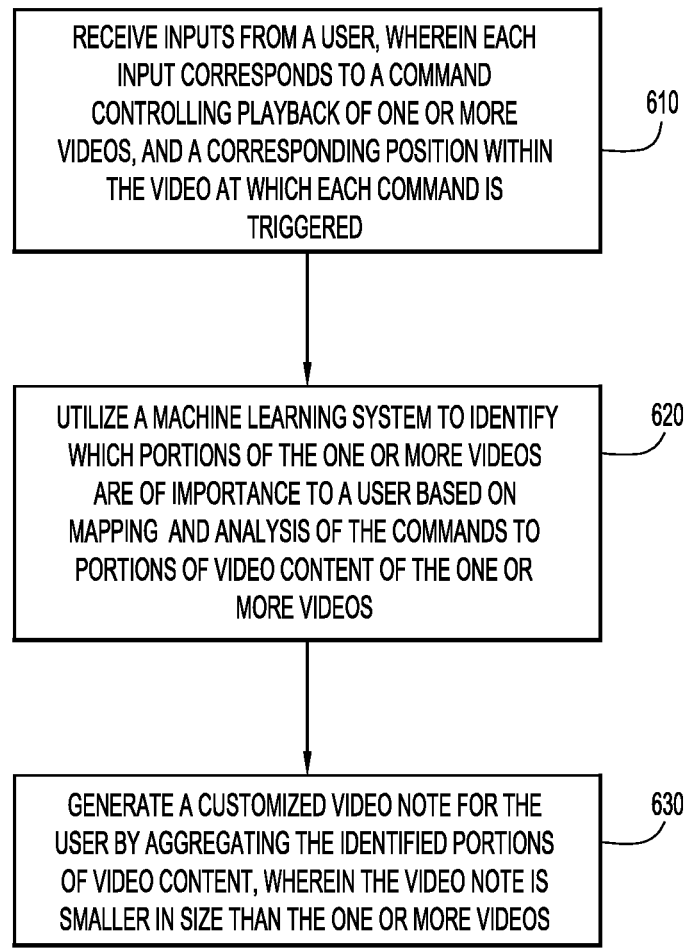
FIG. 6 is another flowchart of an example computer-implemented method of generating a customized video note according to an embodiment of the present disclosure.

FIG. 6 shows operations associated with example embodiments of the present invention. At operation 610, inputs from a user (e.g., commands) are received, wherein each input corresponds to a command controlling playback of one or more videos. It is understood that with respect to this application, playback includes all user interactions with a video, e.g., skipping sections, pausing sections, as well as repeating sections and labeling. In some embodiments, commands can also include user labeling of content to include. A corresponding position within the video at which each command is triggered is provided as well. At operation 620, a machine learning system/cognitive system 48 is utilized to identify which portions of the one or more videos are of importance based on a mapping and analysis of the commands to portions of video content of the one or more videos. At operation 630, a customized v-note is generated for the user by aggregating the identified portions of video content, wherein the v-note is smaller in size than the one or more videos.

Advantages of present invention embodiments include creating a v-note which contains the most important content of one or more videos. Therefore, a user does not need to review the entire video, e.g., in order to prepare for a test or other event which would necessitate review of the one or more videos.

In some embodiments, a size threshold may be set for generating the v-note, and if the v-note exceeds the size, an error may be generated. The user can adjust the size threshold to include content of higher importance (e.g., portions of video content having multiple indications or based on commands having a high weighting, etc.).

It will be appreciated that the embodiments described above and illustrated in the drawings represent only a few of the many ways of implementing embodiments for using machine learning systems/cognitive systems for generating v-notes. Although the techniques presented herein utilize techniques involving the transfer of videos and video annotation files, these techniques may be extended to technologies involving streaming of videos from a remote server. In this embodiment, the videos are not stored locally. However, the video annotation file may be generated locally on the client system. The server can map the commands in the video annotation file to the video (e.g., stored on the server or at another accessible site), e.g., based on a timestamp. The v-note may be generated according to the techniques presented herein.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, video playback module, cognitive system module, etc.). These systems may include any types of monitors and input devices (e.g., keyboard, mouse, voice recognition, etc.) to enter and/or view information.

It is to be understood that the software (e.g., cognitive system 48 and its respective modules, video playback module 18 and its respective modules, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., cognitive system 48 and its respective modules, video playback module 18 and its respective modules, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., video annotation file, videos, v-notes, user IDs, data pertaining to facial analysis, data pertaining to command mapping, algorithms and parameters to identify complete sentences in one or more languages, algorithms and parameters to identify important and unimportant video content, etc.). The database system may be implemented by any number of any conventional or other databases, data stores or storage structures (e.g., files, databases, data structures, data or other repositories, etc.) to store information (e.g., the video annotation file, videos, v-notes, user IDs, data pertaining to facial analysis, data pertaining to command mapping, algorithms and parameters to identify complete sentences in one or more languages, algorithms and parameters to identify important and unimportant video content, etc.). The database system may be included within or coupled to the server and/or client systems. The database systems and/or storage structures may be remote from or local to the computer or other processing systems, and may store any desired data (e.g., the video annotation file, videos, v-notes, user IDs, data pertaining to facial analysis, data pertaining to command mapping, algorithms and parameters to identify complete sentences in one or more languages, algorithms and parameters to identify important and unimportant video content, etc.).

The present invention embodiments may employ any number of any type of user interface (e.g., Graphical User Interface (GUI), command-line, prompt, etc.) for obtaining or providing information (e.g., commands to control playback of video, or labeling by a user to identify important portions of the video, editing of the video annotation file, viewing of the v-note, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., commands and corresponding positions in the video, the length of the v-note, etc.).

The present invention embodiments are not limited to the specific tasks or algorithms described above, but may be utilized for any task that involves mining large amounts of data in a video format or other format in which large volumes of data (e.g., film, microfiche, etc.) may be converted to digital format and reviewed using the techniques described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving inputs from a user, wherein each input corresponds to a command controlling playback of one or more videos, and a corresponding position within the video at which each command is triggered;
utilizing a machine learning system to identify which portions of video content of the one or more videos are of importance to a user based on mapping and analysis of the commands to portions of video content of one or more videos, wherein each portion of video content is associated with a quantity of indications of importance based on the commands;
identifying the portions that fall within a specified time proximity, wherein at least two identified portions are non-contiguous, and an end of a first portion falls within the specified time proximity of a beginning of a second portion;
determining a range corresponding to the portions within the specified time proximity, wherein the range is determined by the earliest timestamp of the portions and the latest timestamp of the portions, and generating a portion of video content, including a non-identified portion interposed between the first portion and the second portion, based on the range; and
generating a customized video note for the user by aggregating the range-based portion of video content with the identified portions of video content satisfying a threshold quantity of indications of importance, wherein the customized video note is smaller in file size than the one or more videos, and generating the customized video note comprises:
controlling the file size of the customized video note by adjusting the threshold quantity of indications of importance.

2. The method of claim 1, wherein the identified portions of video content are arranged in chronological order.

3. The method of claim 1, wherein the identified portions of video content are arranged in an order based on the quantity of indications of importance.

4. The method of claim 1, wherein the command is selected from a group consisting of: a repeat command, a skip command, a pause command, and a user label.

5. The method of claim 1, further comprising:
analyzing language in the corresponding audio file of the one or more videos by the machine learning system to identify complete sentences;
adjusting the identified portions of video content, wherein each adjusted portion of video content corresponds to one or more complete sentences; and
aggregating the adjusted portions of video content to form the customized video note.

6. The method of claim 1, further comprising:
utilizing the machine learning system to determine a level of interest of a user watching a portion of video content; and
identifying which portions of video content are of importance based on the level of interest.

7. The method of claim 1, wherein the machine learning system identifies portions of video content as important based on user labeling.

8. The method of claim 1, wherein the machine learning system analyzes the video to determine which portions of video content are unimportant.

9. A machine learning system comprising one or more processors, the one or more processors configured to:
receive inputs from a user, wherein each input corresponds to a command controlling playback of one or more videos, and a corresponding position within the video at which each command is triggered;
utilize the machine learning system to identify which portions of video content of the one or more videos are of importance to a user based on mapping and analysis of the commands to portions of video content of one or more videos, wherein each portion of video content is associated with a quantity of indications of importance based on the commands;
identify the portions that fall within a specified time proximity, wherein at least two identified portions are non-contiguous, and an end of a first portion falls within the specified time proximity of a beginning of a second portion;
determine a range corresponding to the portions within the specified time proximity, wherein the range is determined by the earliest timestamp of the portions and the latest timestamp of the portions, and generate a portion of video content, including a non-identified portion interposed between the first portion and the second portion, based on the range; and
generate a customized video note for the user by aggregating the range-based portion of video content with the identified portions of video content satisfying a threshold quantity of indications of importance, wherein the customized video note is smaller in file size than the one or more videos, and generating the customized video note comprises:
controlling the file size of the customized video note by adjusting the threshold quantity of indications of importance.

10. The machine learning system of claim 9, wherein the identified portions of video content are arranged in chronological order, or in an order based on the quantity of indications of importance.

11. The machine learning system of claim 9, wherein the command is selected from a group consisting of: a repeat command, a skip command, a pause command, and a user label.

12. The machine learning system of claim 9, wherein the one or more processors are further configured to:
analyze language in the corresponding audio file of the one or more videos by the machine learning system to identify complete sentences;
adjust the identified portions of video content, wherein each adjusted portion of video content corresponds to one or more complete sentences; and
aggregate the adjusted portions of video content to form the customized video note.

13. The machine learning system of claim 9, wherein the one or more processors are further configured to:
utilize the machine learning system to determine a level of interest of a user watching a portion of video content;
identify which portions of video content are of importance based on the level of interest.

14. The machine learning system of claim 9, wherein the one or more processors are further configured to identify portions of video content as important based on user labeling.

15. A computer program product for generating a customized video note using a machine learning system, the computer program product comprising a computer readable storage medium having program instructions embodied therewith, the program instructions executable by a processor to:
- identify which portions of video content of one or more videos are of importance to a user based on mapping and analysis of inputs received from a user to portions of video content of the one or more videos, wherein each input corresponds to a command controlling playback of one or more videos and a corresponding position within the video at which each command is triggered, and wherein each portion of video content is associated with a quantity of indications of importance based on the commands;
- identify the portions that fall within a specified time proximity, wherein at least two identified portions are non-contiguous, and an end of a first portion falls within the specified time proximity of a beginning of a second portion;
- determine a range corresponding to the portions within the specified time proximity, wherein the range is determined by the earliest timestamp of the portions and the latest timestamp of the portions, and generate a portion of video content, including a non-identified portion interposed between the first portion and the second portion, based on the range; and
- generate a customized video note for the user by aggregating the range-based portion of video content with the identified portions of video content satisfying a threshold quantity of indications of importance, wherein the customized video note is smaller in file size than the one or more videos, and generating the customized video note comprises:
  - controlling the file size of the customized video note by adjusting the threshold quantity of indications of importance.

16. The computer program product of claim 15, wherein the identified portions of video content are arranged in chronological order or in an order based on the quantity of indications of importance.

17. The computer program product of claim 15, wherein the command is selected from a group consisting of: a repeat command, a skip command, a pause command, and a user label.

18. The computer program product of claim 15, wherein the program instructions are executable by the processor to:
- analyze language in the corresponding audio file of the one or more videos by the machine learning system to identify complete sentences;
- adjust the identified portions of video content, wherein each adjusted portion of video content corresponds to one or more complete sentences; and
- aggregate the adjusted portions of video content to form the customized video note.

19. The computer program product of claim 15, wherein the program instructions are executable by the processor to:
- utilize the machine learning system to determine a level of interest of a user watching a portion of video content; and
- identify which portions of video content are of importance based on the level of interest.

20. The computer program product of claim 15, wherein the program instructions are executable by the processor to identify portions of video content as important based on user labeling.

* * * * *